United States Patent
Shibuta et al.

(10) Patent No.: US 7,749,567 B2
(45) Date of Patent: Jul. 6, 2010

(54) PROCESS FOR PRODUCING A LAYERED ARTICLE

(75) Inventors: Takumi Shibuta, Ichihara (JP); Jinsho Nambu, Kamakura (JP); Taiichi Sakaya, Chiba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 667 days.

(21) Appl. No.: 11/361,186

(22) Filed: Feb. 24, 2006

(65) Prior Publication Data

US 2006/0193987 A1 Aug. 31, 2006

(30) Foreign Application Priority Data

Feb. 28, 2005 (JP) .............................. 2005-052872
Feb. 28, 2005 (JP) .............................. 2005-052873

(51) Int. Cl.
*B05D 3/00* (2006.01)
*B05D 1/40* (2006.01)
*B05D 3/02* (2006.01)

(52) U.S. Cl. .................. 427/331; 264/1.7; 264/2.7; 264/284; 427/180; 427/372.2

(58) Field of Classification Search ............... 427/331
See application file for complete search history.

(56) References Cited

U.S. PATENT DOCUMENTS 7,108,810 B2 * 9/2006 Nakamura et al. ........... 264/1.7

FOREIGN PATENT DOCUMENTS

| JP | 5-13021 A | | 1/1993 |
|---|---|---|---|
| JP | 7-198904 A | | 8/1995 |
| JP | 10-168359 A | | 6/1998 |
| JP | 10168359 A | * | 6/1998 |
| JP | 2002-82206 A | | 3/2002 |
| JP | 2002082206 A | * | 3/2002 |
| JP | 2004-307856 A | | 11/2004 |

* cited by examiner

*Primary Examiner*—Michael Kornakov
*Assistant Examiner*—Alexander Weddle
(74) *Attorney, Agent, or Firm*—Panitch Schwarze Belisario & Nadel LLP

(57) ABSTRACT

Disclosed is a process for producing a layered article including a substrate and an inorganic particle layer formed thereon, the process including: preparing a mixed inorganic particle dispersion comprising a liquid dispersion medium containing inorganic particles (A) and inorganic particles (B), the mixed inorganic particle dispersion being characterized by conditions (1) regarding particle size, (2) regarding volume fraction of inorganic particles and (3) regarding weight fraction; applying the mixed inorganic particle dispersion to a substrate, and removing the liquid dispersion medium from the mixed inorganic particle dispersion applied to form an inorganic particle layer on the substrate.

16 Claims, 3 Drawing Sheets

0.2 μm 0.2 μm 0.2 μm

PROCESS FOR PRODUCING A LAYERED ARTICLE

BACKGROUND OF THE INVENTION

1. Field of the Invention

The present invention relates to a process for producing a layered article including a substrate and an inorganic particle layer formed thereon.

2. Description of the Related Art

Articles made of thermoplastic resin are generally prone to be poor in antistatic property and tend to adsorb stains. As a thermoplastic resin article inhibited from adsorbing stains, JP 2004-307856 A discloses a stain-proofing film produced by applying a liquid including inorganic colloid to a thermoplastic resin layer and then removing the dispersion medium to form an inorganic particle layer derived from the inorganic colloid.

SUMMARY OF THE INVENTION

In the aforesaid stain-proofing film, the adhesion force between inorganic particles is not very strong and therefore the inorganic particle layer may peeled off when the film is deformed or a foreign force such as frictional force is applied to the film.

In light of such problems with the conventional technology, the present invention intends to provide a process for producing a layered article comprising a substrate and a stable layer of inorganic particles formed thereon, the layer having high strength. Another object of the present invention is to provide a process for producing a layered article comprising a substrate and a stable layer of inorganic particles formed thereon, the layer having high strength and being superior in non-glare property.

In a first embodiment, the present invention provides:

a process for producing a layered article comprising a substrate and an inorganic particle layer formed thereon, the process comprising:

preparing a mixed inorganic particle dispersion liquid comprising a liquid dispersion medium containing inorganic particles (A) and inorganic particles (B), the mixed inorganic particle dispersion liquid being characterized by conditions (1), (2) and (3) provided below;

applying the mixed inorganic particle dispersion liquid to a substrate, and removing the liquid dispersion medium from the mixed inorganic particle dispersion liquid applied to form an inorganic particle layer on the substrate:

condition (1): the inorganic particles (A) have an average particle diameter Da of from 1 to 20 nm, the inorganic particles (B) have an average particle diameter Db of from 30 to 300 nm, and $Da \leq 0.15 \times Db$;

condition (2): $0.01 \leq Va/(Va+Vb) \leq 0.40$ and $0.60 \leq Vb/(Va+Vb) \leq 0.99$, wherein Va and Vb are, respectively, a fraction of the volume of the inorganic particles (A) and a fraction of the volume of the inorganic particles (B) based on the sum of the volumes of the inorganic particles (A) and (B) used for preparing the mixed inorganic particle dispersion liquid; and condition (3): $0.01 \leq (Wa+Wb)/Wt \leq 0.20$, wherein Wa and Wb are the weight of the inorganic particles (A) and the weight of the inorganic particles (B) in the mixed inorganic particle dispersion liquid, respectively, and Wt is the weight of the mixed inorganic particle dispersion liquid.

In a second embodiment, the present invention provides:

a process for producing a layered article comprising a substrate and an inorganic particle layer formed thereon, the process comprising:

preparing a mixed inorganic particle dispersion liquid comprising a liquid dispersion medium containing inorganic particles (A), inorganic particles (B) and inorganic particles (C), the mixed inorganic particle dispersion liquid being characterized by conditions (1), (2) and (3) provided below;

applying the mixed inorganic particle dispersion liquid to a substrate, and removing the liquid dispersion medium from the mixed inorganic particle dispersion liquid applied to form an inorganic particle layer on the substrate:

condition (1): the inorganic particles (A) have an average particle diameter Da of from 1 to 20 nm, the inorganic particles (B) have an average particle diameter Db of from 30 to 300 nm, the inorganic particles (C) have an average particle diameter Dc of from 0.4 to 10 μm, and $Da \leq 0.15 \times Db$;

condition (2): $0.01 \leq Va/(Va+Vb+Vc) \leq 0.45$, $0.45 \leq Vb/(Va+Vb+Vc) \leq 0.98$, and $0.01 \leq Vc/(Va+Vb+Vc) \leq 0.45$, wherein Va, Vb and Vc are, respectively, a fraction of the volume of the inorganic particles (A), a fraction of the volume of the inorganic particles (B) and a fraction of the volume of the inorganic particles (C) based on the sum of the volumes of the inorganic particles (A), (B) and (C) used for preparing the mixed inorganic particle dispersion liquid; and condition (3): $0.01 \leq (Wa+Wb+Wc)/Wt \leq 0.30$ wherein Wa, Wb and Wc are the weight of the inorganic particles (A), the weight of the inorganic particles (B) and the weight of the inorganic particles (C) in the mixed inorganic particle dispersion liquid, respectively, and Wt denotes the weight of the mixed inorganic particle dispersion.

According to the present invention, it is possible to produce a layered article comprising a substrate and an inorganic particle layer formed thereon, the layer being of high strength.

In particular, according to the second embodiment of the present invention, it is possible to form a layered article with good anti-glare property by incorporating inorganic particles (C) having an average particle diameter Dc of from 0.4 to 10 μm.

DESCRIPTION OF THE PREFERRED EMBODIMENTS

Figure 1:
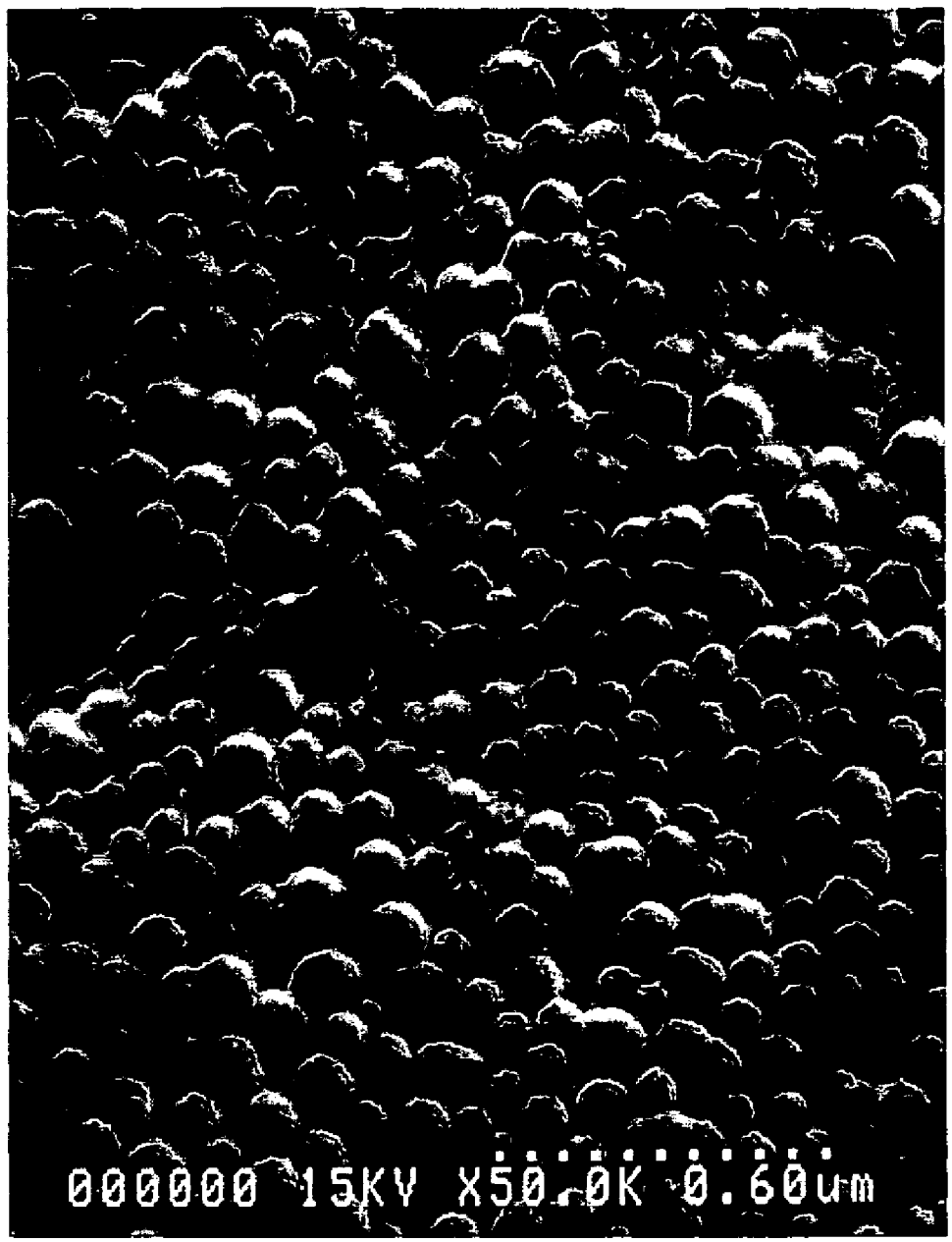
FIG. 1 is an SEM image showing the surface of an inorganic particle layer of the layered article produced in Example 1.

First, the method of the first embodiment of the present invention is explained.

The material of the substrate may be a hard material such as glass or metal, but from the viewpoint of easiness of processing and handling, thermoplastic resin is preferred. Examples of the thermoplastic resin to form the substrate include olefin-based resins such as polyethylene resin, polypropylene resin, copolymers of ethylene and/or α-olefin and other polymerizable monomers; chlorine-containing resins such as polyvinyl chloride resin and polyvinylidene chloride resin; fluorine-containing resins such as tetrafluoroethylene homopolymer, copolymers of tetrafluoroethylene and other polymerizable monomers such as ethylene and α-olefins; polyester resins such as polyethylene terephthalate and polyethylene naphthalate; acrylic resins such as polymethyl methacrylate, copolymers of methyl methacrylate and other polymerizable monomers; styrene-based resins such as polystyrene and copolymers of styrene and other polymerizable monomers; cellulose resins such as triacetylcellulose and diacetylcellulose; polycarbonate resins; polyamide resins; polyurethane resins; and mixtures thereof.

For the preparation of a layered article with high transparency, preferred is use of a substrate made of olefin-based resin, chlorine-containing resin, fluorine-containing resin, polyester resin, acrylic resin, styrene-based resin, cellulose resin or polycarbonate resin.

The substrate may be either a monolayer substrate composed of a single layer or a multilayer substrate composed of two or more layers. Examples of the multilayer substrate include multilayer substrates composed of two or more layers each made of thermoplastic resin and composite multilayer substrates composed of one or more layers each made of thermoplastic resin and one or more layers each made of a material other than thermoplastic resin (e.g., metal).

The shape, size and thickness of the substrate are not particularly limited.

The mixed inorganic particle dispersion liquid for use in the method of the first embodiment of the present invention satisfies the following conditions (1), (2) and (3):

condition (1): the inorganic particles (A) have an average particle diameter Da of from 1 to 20 nm, the inorganic particles (B) have and average particle diameter Db of from 30 to 300 nm, and $Da \leq 0.15 \times Db$;

condition (2): $0.01 \leq Va/(Va+Vb) \leq 0.40$ and $0.60 \leq Vb/(Va+Vb) \leq 0.99$, wherein Va and Vb are, respectively, a fraction of the volume of the inorganic particles (A) and a fraction of the volume of the inorganic particles (B) based on the sum of the volumes of the inorganic particles (A) and (B) used for preparing the mixed inorganic particle dispersion liquid; and condition (3): $0.01 \leq (Wa+Wb)/Wt \leq 0.20$ wherein Wa and Wb are the weight of the inorganic particles (A) and the weight of the inorganic particles (B) in the mixed inorganic particle dispersion liquid, respectively, and Wt denotes the weight of the mixed inorganic particle dispersion.

In the preparation of the mixed inorganic particle dispersion liquid, inorganic particles (A) having an average particle diameter Da of from 1 to 20 nm and inorganic particles (B) having an average particle diameter Db of from 30 to 300 nm are selected so that a condition $Da \leq 0.15 \times Db$ is satisfied and then the two types of inorganic particles are mixed in a quantitative relationship satisfying the above-identified conditions (2) and (3).

The chemical composition of the inorganic particles (A) and that of the inorganic particles (B) may be the same or different. Examples of inorganic particles to be used as the inorganic particles (A) or the inorganic particles (B) include metal particles, metal oxide particles, metal hydroxide particles, metal carbonate particles and metal sulfate particles. Examples of metal elements of metal particles include gold, palladium, platinum and silver. Metal elements of metal oxide particles, metal hydroxide particles, metal carbonate particles and metal sulfate particles include silicon, aluminum, zinc, magnesium, calcium, barium, titanium, zirconium, manganese, iron, cerium, nickel and tin. From the viewpoints of uniformity and denseness of an inorganic particle layer to be formed, particles of oxide or hydroxide of silicon or aluminum are suitably employed.

Particularly, use of metal oxide particles or metal hydroxide particles is desirable. In particular, particles of oxide or hydroxide of silicon or aluminum are preferred. Use of such inorganic particles makes it possible to form an inorganic particle layer in which inorganic particles have been packed extremely densely and uniformly. In order to form a highly transparent inorganic particle layer, use of silica particles as the inorganic particles (A) and (B) is more desirable.

The method for the preparation of the mixed inorganic particle dispersion liquid typically is, but is not limited to, any one of the following methods [1] through [5].

[1] A method in which a powder of inorganic particles (A) and a powder of inorganic particles (B) are added to a common liquid dispersion medium and dispersed therein.

[2] A method in which inorganic particles (A) are dispersed in a first liquid dispersion medium to form a first dispersion liquid and inorganic particles (B) are dispersed in a second liquid dispersion medium to form a second dispersion liquid and then the first and second dispersion liquids are combined together.

[3] A method in which inorganic particles (A) is dispersed in a liquid dispersion medium to form a dispersion liquid and then a powder of inorganic particles (B) is added to and dispersed in the dispersion liquid.

[4] A method in which inorganic particles (B) is dispersed in a liquid dispersion medium to form a dispersion liquid and then a powder of inorganic particles (A) is added to and dispersed in the dispersion liquid.

[5] A method in which particle seeds are grown in a first dispersion medium to yield a first dispersion liquid including inorganic particles (A) and particle seeds are grown in a second dispersion medium to yield a second dispersion liquid including inorganic particle (B), and then the first and second dispersion liquid are combined together.

By application of a strongly dispersing technique such as ultrasonic dispersion and super-high pressure dispersion allows inorganic particles to disperse extremely uniformly in a mixed inorganic particle dispersion liquid.

For achieving a more uniform dispersion, it is desirable that inorganic particles be in a colloid state in a dispersion liquid of inorganic particles (A), or in a dispersion liquid of inorganic particles (B) or in a mixed inorganic particle dispersion liquid finally produced.

In the aforesaid methods [2] through [5], when the dispersion liquid of inorganic particles (A), or the dispersion liquid of inorganic particles (B) or both the dispersion liquid of inorganic particles (A) and the dispersion liquid of inorganic particles (B) are colloidal alumina, it is desirable to add anions such as chloride ion, sulfate ion and acetate ion as a counter ion to the colloidal alumina in order to stabilize alumina particles which are prone to be charged positively. The pH value of colloidal alumina is not particularly limited, but it is desirably from 2 to 6 from the viewpoint of stability of the dispersion liquid.

Even in method [1], when at least one of inorganic particles (A) and inorganic particles (B) is alumina and the mixed inorganic particle dispersion liquid is in a colloid state, it is desirable to add an anion such as chloride ion, sulfate ion and acetate ion, to the mixed inorganic particle dispersion liquid.

In the methods [2] through [5], when the dispersion liquid of inorganic particles (A), or the dispersion liquid of inorganic particles (B) or both the dispersion liquid of inorganic particles (A) and the dispersion liquid of inorganic particles (B) are colloidal silica, it is desirable to add cations such as ammonium ion, alkali metal ion and alkaline earth metal ion as a counter ion to the colloidal silica in order to stabilize silica particles which are prone to be charged negatively. The pH value of colloidal silica is not particularly limited, but it is desirably from 8 to 11 from the viewpoint of stability of the dispersion liquid.

Even in the method [1], when at least one of inorganic particles (A) and inorganic particles (B) is silica and the mixed inorganic particle dispersion liquid is in a colloid state, it is desirable to add a cation such as ammonium ion, alkali metal ion and alkaline earth metal ion to the mixed inorganic particle dispersion liquid.

In the first embodiment of the present invention, it is necessary that the inorganic particles (A) have an average particle diameter Da of from 1 to 20 nm, that the inorganic particles (B) have an average particle diameter Db of from 30 to 300 nm and that $Da \leq 0.15 \times Db$. Here, the average particle diameter Da of inorganic particles (A) is determined by the dynamic light scattering method or the Sears method. The measurement of an average particle diameter by the dynamic light scattering method is carried out by use of a commercially available particle size distribution analyzer. The Sears method, which is disclosed in Analytical Chemistry, vol. 28, p. 1981-1983, 1956, is an analysis technique to be applied to the determination of an average particle diameter of silica particles. It is a method in which the amount of NaOH needed to increase the pH value of colloidal silica from 3 to 9 is determined by titration and the surface area of silica particles is calculated on the basis of the result of the titration, and finally a sphere equivalent particle diameter is determined. The sphere equivalent particle diameter is used as an average particle diameter. The average particle diameter Db of the inorganic particles (B) is a sphere equivalent diameter determined by the BET method or the laser diffraction scattering method.

The mixed inorganic particle dispersion liquid for use in the first embodiment of the present invention must satisfy the following condition (2):

condition (2): $0.01 \leq Va/(Va+Vb) \leq 0.40$ and $0.60 \leq Vb/(Va+Vb) \leq 0.99$, wherein Va and Vb are, respectively, a fraction of the volume of the inorganic particles (A) and a fraction of the volume of the inorganic particles (B) based on the sum of the volumes of the inorganic particles (A) and (B) used for the preparation of the mixed inorganic particle dispersion liquid.

The volume fraction of inorganic particles (A) and that of inorganic particles (B) may be calculated using the densities and weights of the inorganic particles. When inorganic particles (A) and inorganic particles (B) are of the same chemical species, the weight fractions of the inorganic particles (A) and (B) can be considered as volume fractions of the inorganic particles (A) and (B), respectively. Densities of inorganic particles are determined by helium pycnometry. The condition (2) can be satisfied by properly choosing the densities and amounts of the inorganic particles (A) and the inorganic particles (B) to be used in the preparation of a mixed inorganic particle dispersion liquid.

The mixed inorganic particle dispersion liquid for use in the first embodiment of the present invention must satisfy the following condition (3):

condition (3): $0.01 \leq (Wa+Wb)/Wt \leq 0.20$, wherein Wa and Wb are the weight of the inorganic particles (A) and the weight of the inorganic particles (B) in the mixed inorganic particle dispersion liquid, respectively, and Wt denotes the weight of the mixed inorganic particle dispersion. The condition (3) can be satisfied by properly choosing the amounts of the inorganic particles (A), the inorganic particles (B) and the liquid dispersion medium to be used in the preparation of a mixed inorganic particle dispersion liquid.

Next, the method of the second embodiment of the present invention is described. If a matter in the second embodiment is common to that previously described for the first embodiment, such a fact will be stated and a detailed description for the matter will be omitted.

A substrate to be used in the method of the second embodiment is the same as that to be used in the method of the first embodiment.

The mixed inorganic particle dispersion liquid for use in the method of the second embodiment satisfies the following conditions (1), (2) and (3):

condition (1): the inorganic particles (A) have an average particle diameter Da of from 1 to 20 nm, the inorganic particles (B) have an average particle diameter Db of from 30 to 300 nm, the inorganic particles (C) have an average particle diameter Dc of from 0.4 to 10 µm, and $Da \leq 0.15 \times Db$;

condition (2): $0.01 \leq Va/(Va+Vb+Vc) \leq 0.45$, $0.45 \leq Vb/(Va+Vb+Vc) \leq 0.98$, and $0.01 \leq Vc/(Va+Vb+Vc) \leq 0.45$, wherein Va, Vb and Vc are, respectively, a fraction of the volume of the inorganic particles (A), a fraction of the volume of the inorganic particles (B) and a fraction of the volume of the inorganic particles (C) based on the sum of the volumes of the inorganic particles (A), (B) and (C) used for the preparation of the mixed inorganic particle dispersion liquid; and condition (3): $0.01 \leq (Wa+Wb+Wc)/Wt \leq 0.30$ wherein Wa, Wb and Wc are the weight of the inorganic particles (A), the weight of the inorganic particles (B) and the weight of the inorganic particles (C) in the mixed inorganic particle dispersion liquid, respectively, and Wt denotes the weight of the mixed inorganic particle dispersion.

In the preparation of the mixed inorganic particle dispersion, inorganic particles (A) having an average particle diameter Da of from 1 to 20 nm and inorganic particles (B) having an average particle diameter Db of from 30 to 300 nm are selected so that a condition $Da \leq 0.15 \times Db$ is satisfied and then the two types of inorganic particles and inorganic particles (C) having an average particle diameter Dc of from 0.4 to 10 µm are mixed in a quantitative relationship satisfying the above-identified conditions (2) and (3).

The inorganic particles (A) and the inorganic particles (B) used in the second embodiment are the same as those to be used in the first embodiment. In addition, the inorganic particles (C) used in the second embodiment have a chemical composition which may be either the same as or different from that of the inorganic particles (A) or the inorganic particles (B). Like the inorganic particles (A) and (B), examples of the inorganic particles (C) include metal particles, metal oxide particles, metal hydroxide particles, metal carbonate particles, metal sulfate particles. Examples of metal elements of metal particles include gold, palladium, platinum and silver. Metal elements of metal oxide particles, metal hydroxide particles, metal carbonate particles and metal sulfate particles include silicon, aluminum, zinc, magnesium, calcium, barium, titanium, zirconium, manganese, iron, cerium, nickel and tin.

Also as the inorganic particles (C), particles of oxide or hydroxide of metal are desirably used. In particular, particles of oxide or hydroxide of silicon or aluminum are desirable. The inorganic particles (C) have an average particle diameter Dc of from 0.4 to 10 µm. Use of the inorganic particles (C) having such an average particle diameter allows a resulting inorganic particle layer to have good anti-glare property.

The method for the preparation of the mixed inorganic particle dispersion typically is, but is not limited to, any one of the following methods [1] through [9].

[1] A method in which a powder of inorganic particles (A), a powder of inorganic particles (B) and a powder of inorganic particles (C) are added to a common liquid dispersion medium and dispersed therein.

[2] A method in which inorganic particles (A) are dispersed in a first liquid dispersion medium to form a first dispersion liquid, inorganic particles (B) are dispersed in a second liquid dispersion medium to form a second dispersion liquid and inorganic particles (C) are dispersed in a third liquid dispersion medium to form a third dispersion liquid, and then the first, second and third dispersion liquids are combined together.

[3] A method in which one type of inorganic particles selected from inorganic particles (A), inorganic particles (B) and inorganic particles (C) is dispersed in a liquid dispersion medium to form a dispersion liquid and then the remaining two types of inorganic particles are added to and dispersed in the dispersion liquid. (This method is a modification of the method [1].)

[4] A method in which two types of inorganic particles selected from inorganic particles (A), inorganic particles (B) and inorganic particles (C) are dispersed in a liquid dispersion medium to form a dispersion liquid and then the remaining one type of inorganic particles is added to the dispersion liquid and dispersed therein. (This method is another modification of the method [1].)

[5] A method in which two types of inorganic particles selected from inorganic particles (A), inorganic particles (B) and inorganic particles (C) are dispersed separately in separate liquid dispersion media to form a first and second dispersion liquids and then the dispersion liquids are combined together and finally a powder of the remaining one type of inorganic particles is added to and dispersed in the combined dispersion liquid.

[6] A method in which inorganic particles (A) are dispersed in a first liquid dispersion medium to form a first dispersion liquid, inorganic particles (B) are dispersed in a second liquid dispersion medium to form a second dispersion liquid and inorganic particles (C) are dispersed in a third liquid dispersion medium to form a third dispersion liquid, then two of the first, second and third dispersion liquids are combined together, and finally the remaining one dispersion liquid is combined with the previously combined dispersion liquid. (This method is a modification of the method [2].)

[7] A method in which particle seeds are grown in a first dispersion medium to yield a first dispersion liquid including inorganic particles (A) and particle seeds are grown in a second dispersion medium to yield a second dispersion liquid including inorganic particle (B), then the first and second dispersion liquids are combined together, and finally a powder of inorganic particles (C) are added to and dispersed in the combined dispersion liquid.

[8] A method in which particle seeds are grown in a first dispersion medium to yield a first dispersion liquid including inorganic particles (A) and particle seeds are grown in a second dispersion medium to yield a second dispersion liquid including inorganic particle (B), inorganic particles (C) are dispersed in a third dispersion medium to yield a third dispersion liquid, and then the first, second and third dispersion liquids are combined together.

[9] A method in which particle seeds are grown in a first dispersion medium to yield a first dispersion liquid including inorganic particles (A) and particle seeds are grown in a second dispersion medium to yield a second dispersion liquid including inorganic particle (B), inorganic particles (C) are dispersed in a third dispersion medium to yield a third dispersion liquid, and then two of the first, second and third inorganic particle dispersion liquids are combined together, and finally the remaining dispersion liquid is added to the previously combined dispersion liquid. (This method is a modification of the method [8].)

By application of a strongly dispersing technique such as ultrasonic dispersion and super-high pressure dispersion allows inorganic particles to disperse extremely uniformly in a mixed inorganic particle dispersion liquid.

For achieving a more uniform dispersion, it is desirable that inorganic particles be in a colloid state in a dispersion liquid of inorganic particles (A), or in a dispersion liquid of inorganic particles (B), or in a dispersion liquid of inorganic particles (C) or in a mixed inorganic particle dispersion liquid finally formed.

In the aforesaid methods [2] through [9], when an intermediate inorganic particle dispersion liquid including the dispersion liquid of inorganic particles (A), the dispersion liquid of inorganic particles (B), the dispersion liquid of inorganic particles (C) and a mixed dispersion liquid containing two types of inorganic particles is colloidal alumina, it is desirable to add anions such as chloride ion, sulfate ion and acetate ion as a counter ion to the colloidal alumina in order to stabilize alumina particles which are prone to be charged positively. The pH value of colloidal alumina is not particularly limited, but it is desirably from 2 to 6 from the viewpoint of stability of the dispersion liquid.

Even in the method [1], when at least one of inorganic particles (A), inorganic particles (B) and inorganic particles (C) is alumina and the mixed inorganic particle dispersion liquid finally formed is in a colloid state, it is desirable to add an anion such as chloride ion, sulfate ion and acetate ion to the mixed inorganic particle dispersion liquid.

In the aforesaid methods [2] through [9], when an intermediate inorganic particle dispersion liquid including the dispersion liquid of inorganic particles (A), the dispersion liquid of inorganic particles (B), the dispersion liquid of inorganic particles (C) and a mixed dispersion liquid containing two types of inorganic particles is colloidal silica, it is desirable to add cations such as ammonium ion, alkali metal ion and alkaline earth metal ion as a counter ion to the colloidal silica in order to stabilize silica particles which are prone to be charged negatively. The pH value of colloidal silica is not particularly limited, but it is desirably from 8 to 11 from the viewpoint of stability of the dispersion liquid.

Even in the method [1], when at least one of inorganic particles (A), inorganic particles (B) and inorganic particles (C) is silica and the mixed inorganic particle dispersion liquid finally formed is in a colloid state, it is desirable to add a cation such as ammonium ion, alkali metal ion and alkaline earth metal ion to the mixed inorganic particle dispersion liquid.

In the second embodiment of the present invention, it is necessary that the inorganic particles (A) have an average particle diameter Da of from 1 to 20 nm, that the inorganic particles (B) have an average particle diameter Db of from 30 to 300 nm, that the inorganic particles (C) have an average particle diameter Dc of from 0.4 to 10 μm and that $Da \leq 0.15 \times Db$. Here, the meanings and the measuring methods of the average particle diameter Da and the average particle diameter Db are the same as those in the first embodiment. The average particle diameter Dc of the inorganic particles (C) is a sphere equivalent diameter determined by the BET method, the centrifugal sedimentation method or the laser diffraction scattering method.

The mixed inorganic particle dispersion liquid for use in the second embodiment must satisfy the following condition (2):

condition (2): $0.01 \leq Va/(Va+Vb+Vc) \leq 0.45$, $0.45 \leq Vb/(Va+Vb+Vc) \leq 0.98$, and $0.01 \leq Vc/(Va+Vb+Vc) \leq 0.45$, wherein Va, Vb and Vc are, respectively, a fraction of the volume of the inorganic particles (A), a fraction of the volume of the inorganic particles (B) and a fraction of the volume of the inorganic particles (C) based on the sum of the volumes of the inorganic particles (A), (B) and (C) used for the preparation of the mixed inorganic particle dispersion liquid.

The volume fraction of inorganic particles (A), that of inorganic particles (B) and that of inorganic particles (C) may be calculated using the densities and weights of the inorganic particles. When inorganic particles (A), inorganic particles (B) and inorganic particles (C) are of the same chemical species, the weight fractions of the inorganic particles (A), (B) and (C) can be considered as volume fractions of the inorganic particles (A), (B) and (C), respectively. Densities of inorganic particles are determined by helium pycnometry.

The mixed inorganic particle dispersion liquid for use in the second embodiment must satisfy the following condition (3):

condition (3): $0.01 \leq (Wa+Wb+Wc)/Wt \leq 0.30$, wherein Wa, Wb and Wc are the weight of the inorganic particles (A), the weight of the inorganic particles (B) and the weight of the inorganic particles (C) in the mixed inorganic particle dispersion liquid, respectively, and Wt denotes the weight of the mixed inorganic particle dispersion.

The condition (3) can be satisfied by properly choosing the amounts of the inorganic particles (A), the inorganic particles (B), the inorganic particles (C) and the liquid dispersion medium to be used in the preparation of a mixed inorganic particle dispersion liquid.

In the first and second embodiments of the present invention, an additive such as a surfactant and an organic electrolyte may be added to a mixed inorganic particle dispersion liquid for the purpose of, for example, stabilization of the dispersion of inorganic particles.

When a mixed inorganic particle dispersion liquid contains a surfactant, the content thereof is normally up to 0.1 part by weight based on 100 parts by weight of the dispersion medium. The type of the surfactant used is not particularly restricted and may be an anionic surfactant, a cationic surfactant, a nonionic surfactant, or an amphoteric surfactant.

Examples of the anionic surfactant include alkali metal salts of carboxylic acids; specifically, sodium caprylate, potassium caprylate, sodium decanoate, sodium caproate, sodium myristate, potassium oleate, tetramethylammonium stearate and sodium stearate. In particular, alkali metal salts of carboxylic acids having from 6 to 10 carbon atoms are preferred.

Examples of the cationic surfactant include cetyltrimethylammonium chloride, dioctadecyldimethylammonium chloride, N-octadecylpyridinium bromide and cetyltriethylphosphonium bromide.

Examples of the nonionic surfactant include sorbitan esters of fatty acids and glycerol esters of fatty acids.

Examples of the amphoteric surfactant include 2-alkyl-N-carboxyethyl-N-hydroxyethylimidazolinium betaine and lauric amidopropylbetaine.

When a mixed inorganic particle dispersion liquid contains an organic electrolyte, the content thereof is normally up to 0.01 part by weight based on 100 parts by weight of the dispersion medium. The organic electrolyte as used herein is an organic compound which has an ionizing ionic group but which is not a surfactant. Examples thereof include sodium p-toluenesulfonate, sodium benzenesulfonate, potassium butylsulfonate, sodium phenylphosphinate and sodium diethylphosphate. It is desirable that the organic electrolyte be a derivative of benzenesulfonic acid.

In the first and second embodiments of the present invention, the method for applying a mixed inorganic particle dispersion liquid to a substrate is not particularly restricted. The liquid may be applied to the surface of a substrate by a conventional method, such as gravure coating, reverse coating, brush roll coating, spray coating, kiss coating, die coating and dipping/roll bar coating.

Prior to application of a mixed inorganic particle dispersion liquid to a substrate, it is desirable to subject the surface of the substrate to a pretreatment such as corona treatment, ozone treatment, plasma treatment, flaming, electron beam treatment, anchor coating and washing.

Another type of available substrate is a layered article prepared by forming an inorganic cover film on a base material by applying, to a base material, an inorganic substance-containing liquid different than the mixed inorganic particle dispersion liquid to be used in the present invention and then drying the liquid. As the base material, materials provided previously as examples of the substrate may be used. As the inorganic substance-containing liquid, colloidal alumina, colloidal silica and a liquid containing a clay mineral having a characteristic of swelling or cleaving in a dispersion medium are desirably employed.

When the liquid dispersion medium is removed by a proper method from the mixed inorganic particle dispersion liquid applied to a substrate, an inorganic particle layer is formed on the substrate. The removal of the liquid dispersion medium may be carried out by heating under normal or reduced pressure. The pressure and heating temperature to be used for the removal of the liquid dispersion medium may be chosen properly depending on the materials used (namely, the inorganic particles (A), the inorganic particles (B) and the liquid dispersion medium in the first embodiment; the inorganic particles (A), the inorganic particles (B), the inorganic particles (C) and the liquid dispersion medium in the second embodiment). For example, when the dispersion medium is water, drying may be carried out typically at temperatures of from 50 to 80° C., preferably at about 60° C.

In the present invention, it is possible to produce layered articles suitable for various applications by properly choosing the type of a substrate, and the types of the inorganic particles (A) and (B) to be used for forming an inorganic particle layer. For example, when titanium oxide, which is generally called photosemiconductor, is used as inorganic particles, a resulting layered article will be a film having a specific light-absorbing band. Such a material is suitable as a material superior in light transmission controllability.

When inorganic particles having pores are used, a material suitable for imparting a function such as optical function, electronic function, magnetic function and biological function may be introduced into the pores. The introduction of such a material into the pores may be carried out either before or after the formation of an inorganic particle layer on a substrate.

EXAMPLES

The present invention is explained below with reference to Examples, but the scope of the invention is not limited by the Examples.

I. Examples of the First Embodiment

First, examples and a comparative example regarding the first embodiment of the present invention are provided. Test procedures used in the examples are shown below.

<Appearance of Surface of Inorganic Particle Layer>

The surface of an inorganic particle layer was observed by a scanning electron microscope (SEM) and the uniformity and denseness of the inorganic particle layer were evaluated using the SEM image.

<Strength of Inorganic Particle Layer>

The strength of the inorganic particle layer of a layered article was evaluated by the following method.

The surface of an inorganic particle layer was scrubbed back and forth twenty times with laboratory tissue paper (tradename: Kimwipe, manufactured by Crecia Co., Ltd.) and a change in Haze value between before and after the scrubbing was determined. The smaller the change, the higher the strength of the inorganic particle layer. Haze was measured by means of a direct-reading haze computer (HGM-2DP for C light source; manufactured by Suga Test Instruments Co., Ltd.) according to JIS K7105.

<Substrate>

A 130-μm thick three-layer film composed of A layer, B layer and C layer disposed one on another in this order was used as a base material. The A layer, the B layer and the C layer were made of a polyethylene resin (tradename: Sumikathene F208-0; manufactured by Sumitomo Chemical Co., Ltd.), an ethylene/hexene-1 copolymer (tradename: Excellen FX CX2001; manufactured by Sumitomo Chemical Co., Ltd.) and another ethylene/hexene-1 copolymer (tradename: Sumikathene E FV201; manufactured by Sumitomo Chemical Co., Ltd.), respectively. The thickness proportion was A layer/B layer/C layer=2/6/2.

A first dispersion liquid was prepared by dispersing 1 part by weight of synthetic saponite (tradename: Sumecton SA; manufactured by Kunimine Industries, Co., Ltd.) in 99 parts by weight of ion exchange water. Then, a second dispersion liquid was prepared by mixing 9.000% by weight of the first dispersion liquid, 9.000% by weight of colloidal alumina (tradename: Aluminasol 520; manufactured by Nissan Chemical Industries, Ltd.; average particle diameter measured by the BET method: 20 nm; solid concentration: 20% by weight; dispersion medium: water), 2.400% by weight of colloidal silica (tradename: Snowtex 20; manufactured by Nissan Chemical Industries, Ltd.; average particle diameter measured by the BET method: 20 nm; solid concentration: 20% by weight; dispersion medium: water), 0.014% by weight of sodium caprylate (available from Tokyo Chemical Industry Co., Ltd.), 0.002% by weight of sodium p-toluenesulfonate (available from Nacalai Tesque Inc.) and 79.584% by weight of ion exchange water. Corona treatment was applied to the surface of the C layer of the base material and subsequently the second dispersion medium was applied to the corona-treated surface and then dried. Thus, a cover layer was formed on the surface of the C layer. The amount of the second dispersion liquid applied was adjusted so that the weight of a cover layer per unit area of the surface of the C layer after drying became 0.2 g/m$^2$. The drying was carried out at a dryer temperature of 60° C. The thus-produced covered film was used as a substrate in the following examples.

Example 1

A mixed inorganic particle dispersion liquid was prepared by mixing 15 g of colloidal silica (tradename: Snowtex ST-XS; manufactured by Nissan Chemical Industiries, Ltd.; average particle diameter measured by the Sears method: 4-6 nm; solid concentration: 20% by weight; dispersion medium: water) as inorganic particles (A) and 25 g of colloidal silica (tradename: Snowtex ST-ZL; manufactured by Nissan Chemical Industries, Ltd.; average particle diameter measured by the BET method: 78 nm; solid concentration: 40% by weight; dispersion medium: water) as inorganic particles (B) with 60 g of water, followed by stirring by a magnetic stirrer. The ratios of the inorganic particles (A) and (B) to the whole inorganic particles are given in Table 1. The mixed inorganic particle dispersion liquid was applied onto the cover layer of a substrate using a bar coater. Then, the dispersion medium was removed by drying at 60° C., yielding a layered article in which an inorganic particle layer was on the substrate. The inorganic particle layer of the resulting layered article was superior in uniformity and denseness (see FIG. 1) and also in strength.

Example 2

Figure 2:
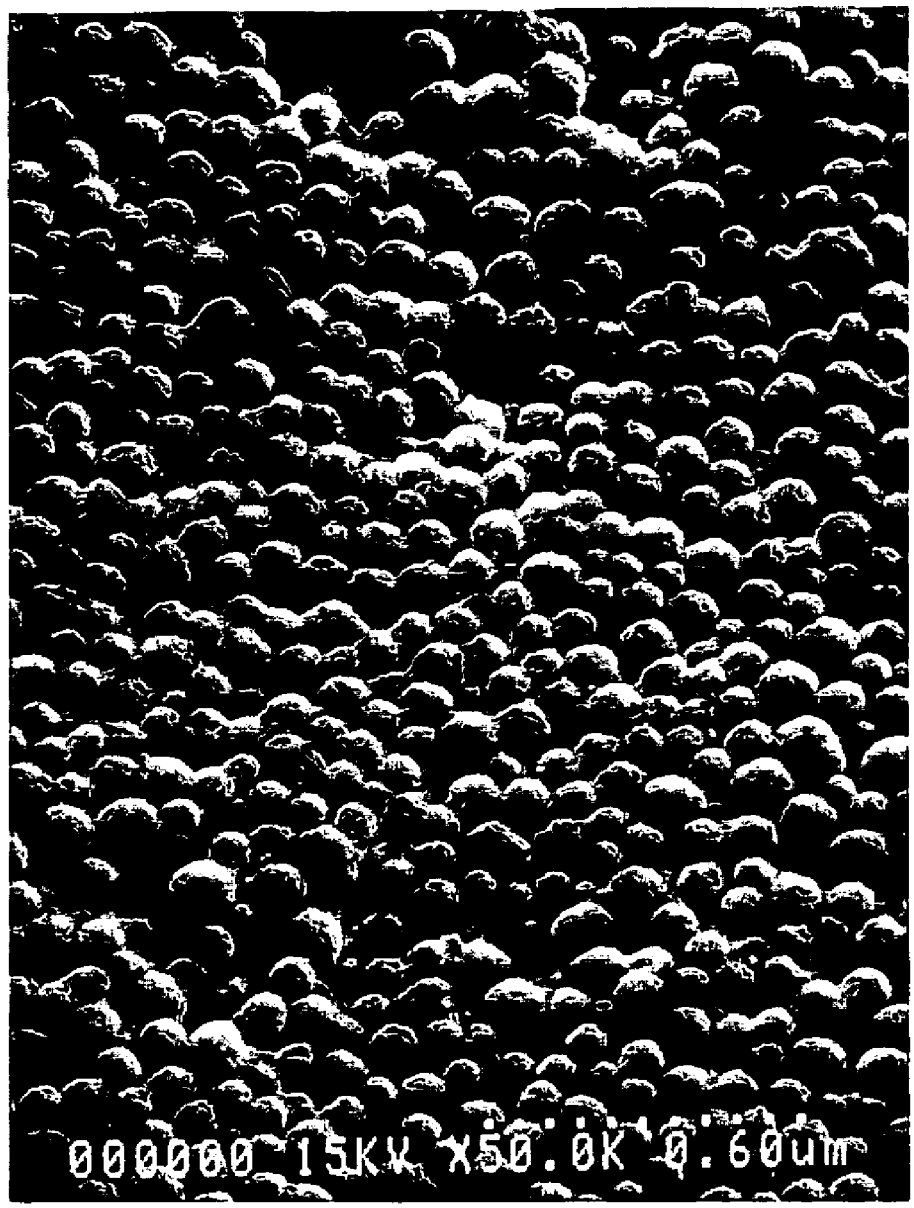
FIG. 2 is an SEM image showing the surface of an inorganic particle layer of the layered article produced in Example 2.

A mixed inorganic particle dispersion liquid was prepared by mixing 5 g of Snowtex ST-XS as inorganic particles (A) and 25 g of Snowtex ST-ZL as inorganic particles (B) with 70 g of water, followed by stirring by a magnetic stirrer. The ratios of the inorganic particles (A) and (B) to the whole inorganic particles are given in Table 1. The mixed inorganic particle dispersion liquid was applied onto the cover layer of a substrate using a bar coater. Then, the dispersion medium was removed by drying at 60° C., yielding a layered article in which an inorganic particle layer is on the substrate. The inorganic particle layer of the resulting layered article was superior in uniformity and denseness (see FIG. 2) and also in strength.

Comparative Example 1

Figure 3:
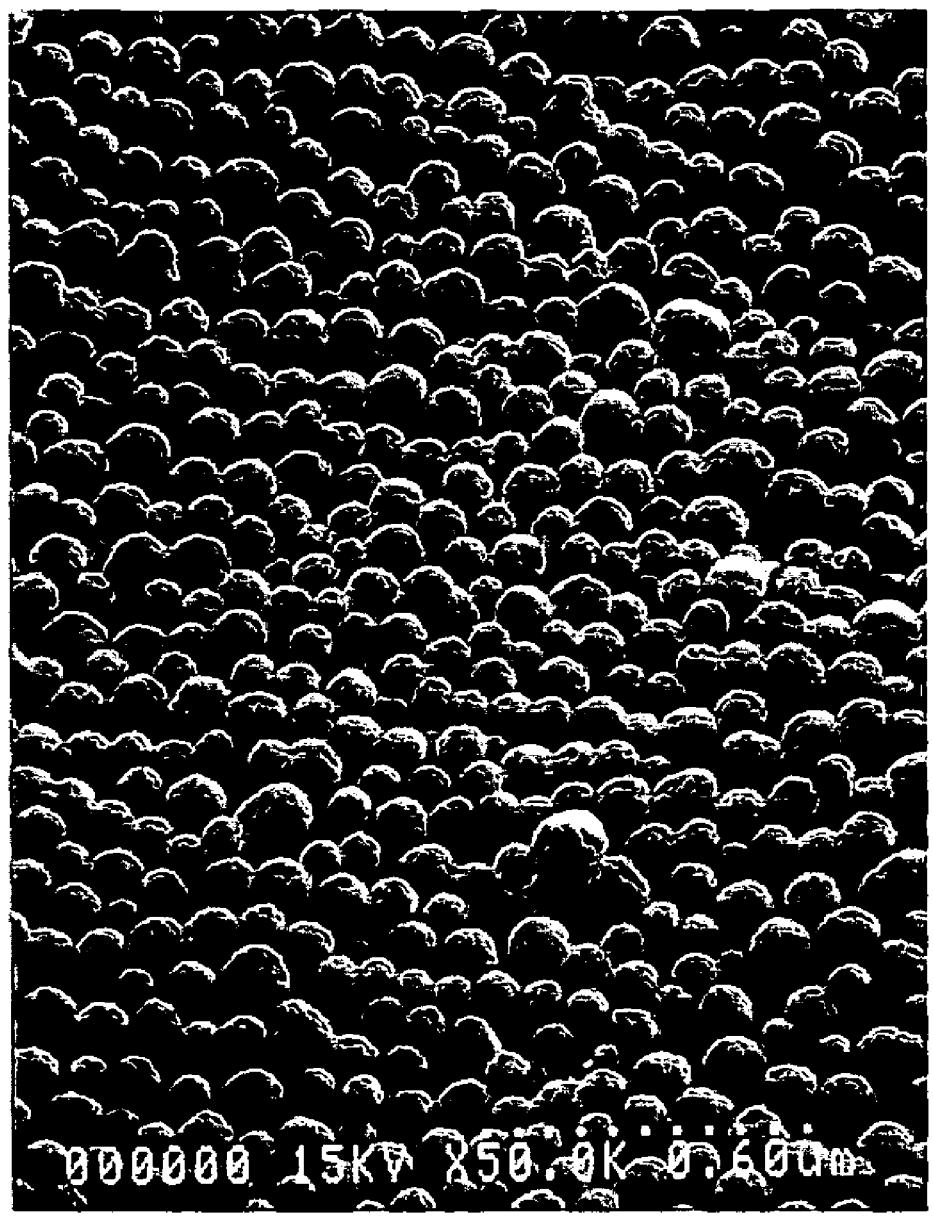
FIG. 3 is an SEM image showing the surface of an inorganic particle layer of the layered article produced in Comparative Example 1.

An inorganic particle dispersion liquid was prepared by mixing 25 g of Snowtex ST-ZL as inorganic particles (B) with 75 g of water, followed by stirring by a magnetic stirrer. The ratio of the inorganic particles (B) to the whole inorganic particles was provided in Table 1. The inorganic particle dispersion liquid was applied onto the cover layer of a substrate using a bar coater. Then, the dispersion medium was removed by drying at 60° C., yielding a layered article in which an inorganic particle layer is on the substrate. The inorganic particle layer of the resulting layered article, the layer being composed only of the inorganic particles (B), was superior in uniformity but poor in denseness (see FIG. 3). In addition, the layer was also insufficient in strength.

II. Examples of Second Embodiment

Examples and comparative example regarding the second embodiment of the present invention are provided below.

Characteristic properties as an anti-glare film were evaluated in the methods provided below.

<Gloss>

Gloss was measured at an incident angle of 60 degrees by use of a gloss meter (GM-3D; manufactured by Murakami Color Research Laboratory Co., Ltd.).

<Anti-Glare Property>

The condition of a reflected image of a fluorescent lamp was observed visually. A case where the contour of the reflected image of the fluorescent lamp was clear was judged as "poor in anti-glare property" and was indicated by a symbol "x". A case where the contour of the reflected image of the fluorescent lamp was a little unclear was judged as "moderate in anti-glare property" and was indicated by a symbol "Δ". A case where the contour of the reflected image of the fluorescent lamp was unclear was judged as "good in anti-glare property" and was indicated by a symbol "○".

<Appearance of Surface of Inorganic Particle Layer>

The surface of an inorganic particle layer was observed by a scanning electron microscope (SEM) and the uniformity and denseness of the inorganic particle layer were evaluated using the SEM image.

<Strength of Inorganic Particle Layer>

The strength of the inorganic particle layer of a layered article was evaluated by the following method.

The surface of an inorganic particle layer was scrubbed back and forth twenty times with laboratory tissue paper (tradename: Kimwipe, manufactured by Crecia Co., Ltd.) and a change in Haze value between before and after the scrubbing was determined. The smaller the change, the higher the strength of the inorganic particle layer. Haze was measured by means of a direct-reading haze computer (HGM-2DP for C light source; manufactured by Suga Test Instruments Co., Ltd.) according to JIS K7105.

<Pencil Hardness>

The pencil hardness of an inorganic particle layer was measured according to JIS K5400 at a load of 1 kgf.

Example 3

A mixed inorganic particle dispersion liquid was prepared by adding 35 g of colloidal silica (tradename: Snowtex ST-XS; manufactured by Nissan Chemical Industiries, Ltd.; average particle diameter measured by the Sears method: 4-6 nm; solid concentration: 20% by weight; dispersion medium: water) as inorganic particles (A), 140 g of colloidal silica (tradename: Snowtex ST-ZL; manufactured by Nissan Chemical Industries, Ltd.; average particle diameter measured by the BET method: 78 nm; solid concentration: 40% by weight; dispersion medium: water) as inorganic particles (B) and 14 g of silica powder (tradename: Seahoster KE-P100; manufactured by Nippon Shokubai Co., Ltd.; average particle diameter measured by the laser diffraction scattering method: 1.01 μm) as inorganic particles (C) to 511 g of pure water, followed by conducting dispersion treatment at an increased pressure of 20 MPa using a high shear fluid processor (tradename: Microfluidizer; manufactured by Microfluidics). The ratios of the inorganic particles (A), (B) and (C) to the whole inorganic particles are given in Table 3. The mixed inorganic particle dispersion liquid was applied onto a triacetylcellulose film (manufactured by Fuji Photo Film Co., Ltd.; pencil hardness: HB) using a bar coater. Then, the dispersion medium was dried at 60° C. and thereby an inorganic particle layer was formed. The resulting inorganic particle layer had a gloss of 55.4. The contour of a reflected image of a fluorescent lamp was unclear. The inorganic particle layer had high strength and a pencil hardness of H. The appearance of the inorganic particle layer was good. The thus-produced non-glare film composed only of inorganic particles was superior in antistatic property, weather resistance and solvent resistance.

Example 4

A mixed inorganic particle dispersion liquid was prepared by adding 70 g of Snowtex ST-XS as inorganic particles (A), 140 g of Snowtex ST-ZL as inorganic particles (B) and 14 g of Seahoster KE-P100 as inorganic particles (C) to 476 g of pure water, followed by conducting dispersion treatment at an increased pressure of 20 MPa using a microfluidizer. The ratios of the inorganic particles (A), (B) and (C) to the whole inorganic particles are given in Table 3. Using this mixed inorganic particle dispersion liquid, an inorganic particle layer was formed on a triacetylcellulose film in the same manner as Example 3. The resulting inorganic particle layer had a gloss of 61.6. The contour of a reflected image of a fluorescent lamp was unclear. The inorganic particle layer had high strength and a pencil hardness of H. The appearance of the inorganic particle layer was good. The thus-produced non-glare film composed only of inorganic particles was superior in antistatic property, weather resistance and solvent resistance.

Example 5

A mixed inorganic particle dispersion liquid was prepared by adding 70 g of Snowtex ST-XS as inorganic particles (A), 140 g of Snowtex ST-ZL as inorganic particles (B) and 28 g of Seahoster KE-P100 as inorganic particles (C) to 462 g of pure water, followed by conducting dispersion treatment at an increased pressure of 20 MPa using a microfluidizer. The ratios of the inorganic particles (A), (B) and (C) to the whole inorganic particles are given in Table 3. Using this mixed inorganic particle dispersion liquid, an inorganic particle layer was formed on a triacetylcellulose film in the same manner as Example 3. The resulting inorganic particle layer had a gloss of 41.2. The contour of a reflected image of a fluorescent lamp was unclear. The inorganic particle layer had high strength and a pencil hardness of H. The appearance of the inorganic particle layer was good. The thus-produced non-glare film composed only of inorganic particles was superior in antistatic property, weather resistance and solvent resistance.

Example 6

A mixed inorganic particle dispersion liquid was prepared by adding 35 g of Snowtex ST-XS as inorganic particles (A), 70 g of Snowtex ST-ZL as inorganic particles (B) and 106 g of silica powder (tradename: Seahoster KE-W50; manufactured by Nippon Shokubai Co., Ltd.; average particle diameter measured by the centrifugal sedimentation method: 0.55 μm) as inorganic particles (C) to 139 g of pure water, followed by stirring using a magnetic stirrer. The ratios of the inorganic particles (A), (B) and (C) to the whole inorganic particles are given in Table 3. Using this mixed inorganic particle dispersion liquid, an inorganic particle layer was formed on a triacetylcellulose film in the same manner as Example 3. The resulting inorganic particle layer had a gloss of 26.1. The contour of a reflected image of a fluorescent lamp was unclear. The inorganic particle layer had high strength and a pencil hardness of H. The appearance of the inorganic particle layer was good. The thus-produced non-glare film composed only of inorganic particles was superior in antistatic property, weather resistance and solvent resistance.

Example 7

A mixed inorganic particle dispersion liquid was prepared by adding 70 g of Snowtex ST-XS as inorganic particles (A), 140 g of Snowtex ST-ZL as inorganic particles (B), 14 g of Seahoster KE-P100 as inorganic particles (C) and 14 g of silica powder (tradename: Seahoster KE-P50; manufactured by Nippon Shokubai Co., Ltd.; average particle diameter measured by the laser diffraction scattering method: 0.54 μm) as inorganic particles (C) to 462 g of pure water, followed by conducting dispersion treatment at an increased pressure of 20 MPa using a microfluidizer. The ratios of the inorganic particles (A), (B) and (C) to the whole inorganic particles are given in Table 3. Using this mixed inorganic particle dispersion liquid, an inorganic particle layer was formed on a triacetylcellulose film in the same manner as Example 3. The resulting inorganic particle layer had a gloss of 32.8. The contour of a reflected image of a fluorescent lamp was unclear. The inorganic particle layer had high strength and a pencil hardness of H. The appearance of the inorganic particle layer was good. The thus-produced non-glare film composed only of inorganic particles was superior in antistatic property, weather resistance and solvent resistance.

Referential Example 1

A mixed inorganic particle dispersion liquid was prepared by adding 70 g of Snowtex ST-XS as inorganic particles (A) and 140 g of Snowtex ST-ZL as inorganic particles (B), to 245 g of pure water, followed by stirring using a magnetic stirrer. The ratios of the inorganic particles (A) and (B) to the whole inorganic particles are given in Table 3. Using this mixed inorganic particle dispersion liquid, an inorganic particle layer was formed on a triacetylcellulose film in the same manner as Example 3. The resulting inorganic particle layer had a gloss of 125.7. The contour of a reflected image of a fluorescent lamp was clear, which means that the anti-glare property of the inorganic particle layer was insufficient. The inorganic particle layer had high strength and a pencil hardness of H. The appearance of the inorganic particle layer was good.

Comparative Example 2

A mixed inorganic particle dispersion liquid was prepared by adding 140 g of Snowtex ST-ZL as inorganic particles (B) and 14 g of Seahoster KE-P100 as inorganic particles (C) to 546 g of pure water, followed by conducting dispersion treatment at an increased pressure of 20 MPa using a microfluidizer. The ratios of the inorganic particles (B) and (C) to the whole inorganic particles are given in Table 3. Using this mixed inorganic particle dispersion liquid, an inorganic particle layer was formed on a triacetylcellulose film in the same manner as Example 3. The resulting inorganic particle layer had a gloss of 85.4. The contour of a reflected image of a fluorescent lamp was a little unclear. During the evaluation of the strength of the inorganic particle layer, leaving of the inorganic particle layer occurred. The pencil hardness was as low as HB. The appearance of the inorganic particle layer was good.

Comparative Example 3

A mixed inorganic particle dispersion liquid was prepared by adding 280 g of Snowtex ST-XS as inorganic particles (A) and 28 g of Seahoster KE-P100 as inorganic particles (C) to 392 g of pure water, followed by conducting dispersion treatment at an increased pressure of 20 MPa using a microfluidizer. The ratios of the inorganic particles (A) and (C) to the whole inorganic particles are given in Table 3. Using this mixed inorganic particle dispersion liquid, an inorganic particle layer was formed on a triacetylcellulose film in the same manner as Example 3. The resulting inorganic particle layer had a gloss of 46.4. The contour of a reflected image of a fluorescent lamp was unclear. The inorganic particle layer had high strength and a pencil hardness of H. In appearance observation, many cracks were found.

TABLE 1

| | Da (nm) | Db (nm) | $V_a/(V_a+V_b)$ | $V_b/(V_a+V_b)$ | $(W_a+W_b)/W_t$ |
|---|---|---|---|---|---|
| Example 1 | 4~6 | 78 | 0.23 | 0.77 | 0.13 |
| Example 2 | 4~6 | 78 | 0.09 | 0.97 | 0.11 |
| Comparative Example 1 | — | 78 | 0.00 | 1.00 | 0.10 |

TABLE 2

| | Change in Haze | Appearance |
|---|---|---|
| Example 1 | +2.0 | Good |
| Example 2 | +2.0 | Good |
| Comparative Example 1 | +9.7 | Poor |

TABLE 3

| | Da [nm] | Db [nm] | Dc [μm] | $V_a/V$ | $V_b/V$ | $V_c/V$ | $(W_a+W_b+W_c)/W_t$ |
|---|---|---|---|---|---|---|---|
| Example 3 | 4-6 | 78 | 1.01 | 0.09 | 0.73 | 0.18 | 0.11 |
| Example 4 | 4-6 | 78 | 1.01 | 0.17 | 0.67 | 0.17 | 0.12 |
| Example 5 | 4-6 | 78 | 1.01 | 0.14 | 0.57 | 0.29 | 0.14 |
| Example 6 | 4-6 | 78 | 0.55 | 0.13 | 0.50 | 0.38 | 0.16 |
| Example 7 | 4-6 | 78 | *1 | 0.14 | 0.57 | 0.29 | 0.14 |
| Ref. Example 1 | 4-6 | 78 | — | 0.20 | 0.80 | 0.00 | 0.10 |
| Comp. Example 2 | — | 78 | 1.01 | 0.00 | 0.80 | 0.20 | 0.10 |
| Comp. Example 3 | 4-6 | — | 1.01 | 0.67 | 0.00 | 0.33 | 0.12 |

$V = V_a + V_b + V_c$
*1: Combination of particles having Dc = 1.01 μm and particles having Dc = 0.54 μm.

TABLE 4

| | Gloss | Anti-glare property | Change in Haze | Pencil hardness | Appearance |
|---|---|---|---|---|---|
| Example 3 | 55.4 | ○ | +0.4 | H | Good |
| Example 4 | 61.6 | ○ | +0.5 | H | Good |
| Example 5 | 41.2 | ○ | +0.8 | H | Good |
| Example 6 | 26.1 | ○ | +0.6 | H | Good |
| Example 7 | 32.8 | ○ | +0.3 | H | Good |
| Referential Example 1 | 125.7 | X | No Data | H | Good |
| Comparative Example 2 | 85.4 | Δ | +1.5 | HB | Good |
| Comparative Example 3 | 46.4 | ○ | +0.0 | H | Poor |

What is claimed is:

1. A process for producing a layered article comprising a substrate and an inorganic particle layer formed thereon, the process comprising:
   preparing a mixed inorganic particle dispersion comprising a liquid dispersion medium containing inorganic particles (A) and inorganic particles (B), the mixed inorganic particle dispersion being characterized by conditions (1), (2) and (3) provided below;
   applying the mixed inorganic particle dispersion to a substrate, and
   removing the liquid dispersion medium from the mixed inorganic particle dispersion applied to form an inorganic particle layer on the substrate; wherein:
   condition (1): the inorganic particles (A) have an average particle diameter Da of from 1 to 20 nm, the inorganic particles (B) have an average particle diameter Db of from 30 to 300 nm, and $Da \leq 0.15 \times Db$;
   condition (2): $0.01 \leq Va/(Va+Vb) \leq 0.40$ and $0.60 \leq Vb/(Va+Vb) \leq 0.99$, wherein Va and Vb are, respectively, a fraction of the volume of the inorganic particles (A) and a fraction of the volume of the inorganic particles (B) based on the sum of the volumes of the inorganic particles (A) and (B) used for preparing the mixed inorganic particle dispersion liquid; and
   condition (3): $0.01 \leq (Wa+Wb)/Wt \leq 0.20$, wherein Wa and Wb are the weight of the inorganic particles (A) and the weight of the inorganic particles (B) in the mixed inorganic particle dispersion liquid, respectively, and Wt is the weight of the mixed inorganic particle dispersion liquid.

2. The process according to claim 1, wherein both the inorganic particles (A) and the inorganic particles (B) are silica.

3. A process for producing a layered article comprising a substrate and an inorganic particle layer formed thereon, the process comprising:
   preparing a mixed inorganic particle dispersion comprising a liquid dispersion medium containing inorganic particles (A), inorganic particles (B) and inorganic particles (C), the mixed inorganic particle dispersion being characterized by conditions (1), (2) and (3) provided below;
   applying the mixed inorganic particle dispersion to a substrate, and
   removing the liquid dispersion medium from the mixed inorganic particle dispersion applied to form an inorganic particle layer on the substrate; wherein:
   condition (1): the inorganic particles (A) have an average particle diameter Da of from 1 to 20 nm, the inorganic particles (B) have an average particle diameter Db of from 30 to 300 nm, the inorganic particles (C) have an average particle diameter Dc of from 0.4 to 10 μm, and $Da \leq 0.15 \times Db$;
   condition (2): $0.01 \leq Va/(Va+Vb+Vc) \leq 0.45$, $0.45 \leq Vb/(Va+Vb+Vc) \leq 0.98$, and $0.01 \leq Vc/(Va+Vb+Vc) \leq 0.45$, wherein Va, Vb and Vc are, respectively, a fraction of the volume of the inorganic particles (A), a fraction of the volume of the inorganic particles (B) and a fraction of the volume of the inorganic particles (C) based on the sum of the volumes of the inorganic particles (A), (B) and (C) used for preparing the mixed inorganic particle dispersion liquid; and
   condition (3): $0.01 \leq (Wa+Wb+Wc)/Wt \leq 0.30$, wherein Wa, Wb and Wc are the weight of the inorganic particles (A), the weight of the inorganic particles (B) and the weight of the inorganic particles (C) in the mixed inorganic particle dispersion liquid, respectively, and Wt denotes the weight of the mixed inorganic particle dispersion.

4. The process according to claim 3, wherein both the inorganic particles (A) and the inorganic particles (B) are silica.

5. The process according to claim 3, wherein the inorganic particles (C) are silica.

6. A process for producing a layered article comprising a substrate and an inorganic particle layer formed thereon, the process comprising:
   preparing a mixed inorganic particle dispersion consisting essentially of a liquid dispersion medium, inorganic particles (A) and inorganic particles (B), the mixed inorganic particle dispersion being characterized by conditions (1), (2) and (3) provided below;
   applying the mixed inorganic particle dispersion to a substrate, and
   removing the liquid dispersion medium from the mixed inorganic particle dispersion applied to form an inorganic particle layer on the substrate; wherein:
   condition (1): the inorganic particles (A) have an average particle diameter Da of from 1 to 20 nm, the inorganic particles (B) have an average particle diameter Db of from 30 to 300 nm, and $Da \leq 0.15 \times Db$;
   condition (2): $0.01 \leq Va/(Va+Vb) \leq 0.40$ and $0.60 \leq Vb/(Va+Vb) \leq 0.99$, wherein Va and Vb are, respectively, a fraction of the volume of the inorganic particles (A) and a fraction of the volume of the inorganic particles (B) based on the sum of the volumes of the inorganic particles (A) and (B) used for preparing the mixed inorganic particle dispersion liquid; and
   condition (3): $0.01 \leq (Wa+Wb)/Wt \leq 0.20$, wherein Wa and Wb are the weight of the inorganic particles (A) and the weight of the inorganic particles (B) in the mixed inorganic particle dispersion liquid, respectively, and Wt is the weight of the mixed inorganic particle dispersion liquid.

7. The process according to claim 6, wherein both the inorganic particles (A) and the inorganic particles (B) are silica.

8. A process for producing a layered article comprising a substrate and an inorganic particle layer formed thereon, the process comprising:
   preparing a mixed inorganic particle dispersion consisting essentially of a liquid dispersion medium, inorganic particles (A), inorganic particles (B) and inorganic particles (C), the mixed inorganic particle dispersion being characterized by conditions (1), (2) and (3) provided below;
   applying the mixed inorganic particle dispersion to a substrate, and
   removing the liquid dispersion medium from the mixed inorganic particle dispersion applied to form an inorganic particle layer on the substrate; wherein:
   condition (1): the inorganic particles (A) have an average particle diameter Da of from 1 to 20 nm, the inorganic particles (B) have an average particle diameter Db of from 30 to 300 nm, the inorganic particles (C) have an average particle diameter Dc of from 0.4 to 10 μm, and $Da \leq 0.15 \times Db$;
   condition (2): $0.01 \leq Va/(Va+Vb+Vc) \leq 0.45$, $0.45 \leq Vb/(Va+Vb+Vc) \leq 0.98$, and $0.01 \leq Vc/(Va+Vb+Vc) \leq 0.45$, wherein Va, Vb and Vc are, respectively, a fraction of the volume of the inorganic particles (A), a fraction of the volume of the inorganic particles (B) and a fraction of the volume of the inorganic particles (C) based on the sum of the volumes of the inorganic particles (A), (B) and (C) used for preparing the mixed inorganic particle dispersion liquid; and condition (3): $0.01 \leq (Wa+Wb+Wc)/Wt \leq 0.30$, wherein Wa, Wb and Wc are the weight of the inorganic particles (A), the weight of the inorganic particles (B) and the weight of the inorganic particles (C) in the mixed inorganic particle dispersion liquid, respectively, and Wt denotes the weight of the mixed inorganic particle dispersion.

9. The process according to claim 8, wherein both the inorganic particles (A) and the inorganic particles (B) are silica.

10. The process according to claim 8, wherein the inorganic particles (C) are silica.

11. The process according to claim 6, wherein the inorganic particle layer consists essentially of inorganic particles (A) and (B).

12. The process according to claim 8, wherein the inorganic particle layer consists essentially of inorganic particles (A) and (B) and (C).

13. The process according to claim 1, wherein the inorganic particle layer consists of inorganic particles (A) and (B).

14. The process according to claim 3, wherein the inorganic particle layer consists of inorganic particles (A), (B), and (C).

15. The process according to claim 1, wherein a surface of the inorganic particle layer comprises inorganic particles in direct contact with one another.

16. The process according to claim 3, wherein a surface of the inorganic particle layer comprises inorganic particles in direct contact with one another.

* * * * *